Figure 1:
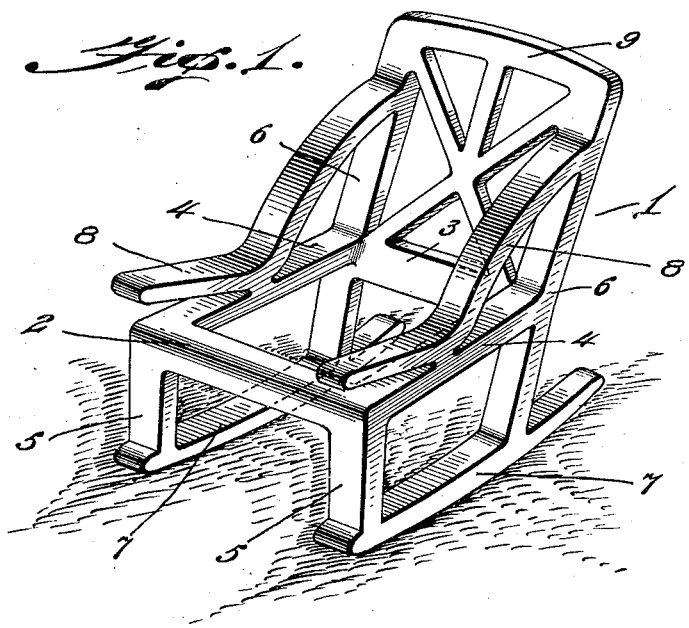

July 14, 1931.  J. ANOSKOPAY  1,814,276
MOLD FOR FORMING MOLDED ARTICLES
Filed Sept. 19, 1929  2 Sheets-Sheet 1

Inventor
Joseph Anoskopay
By Perley H. Plant
Attorney

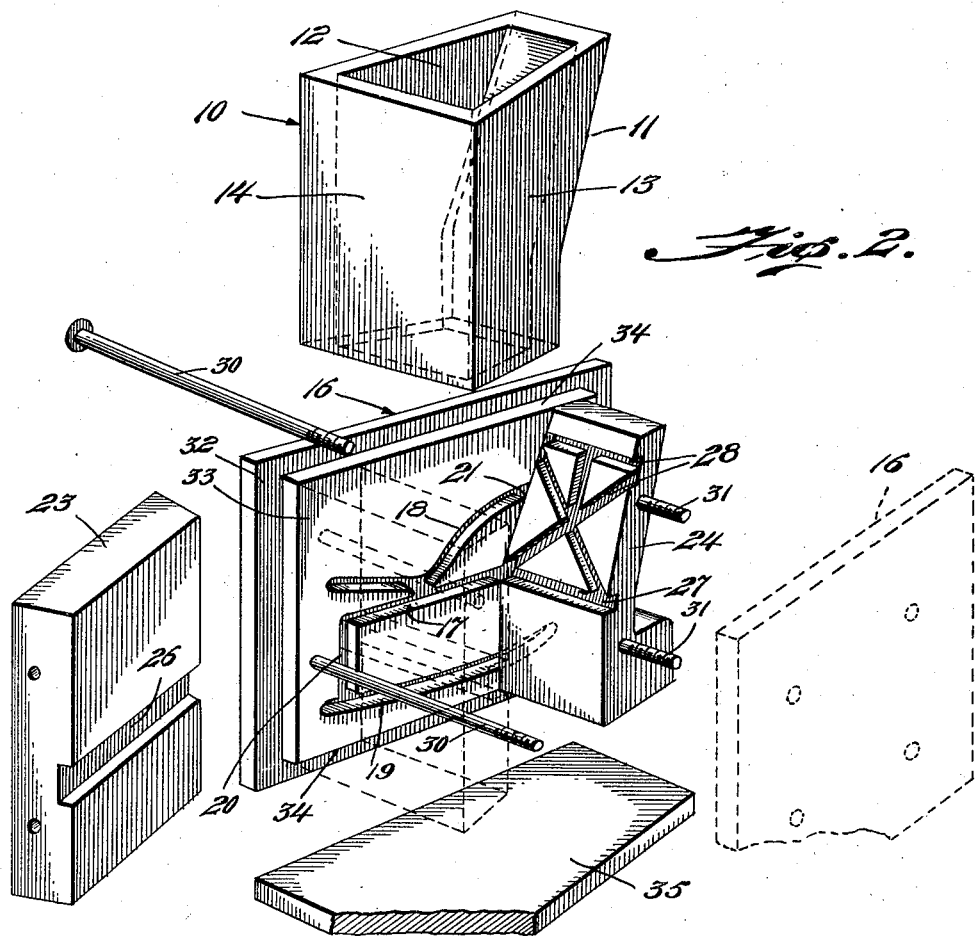
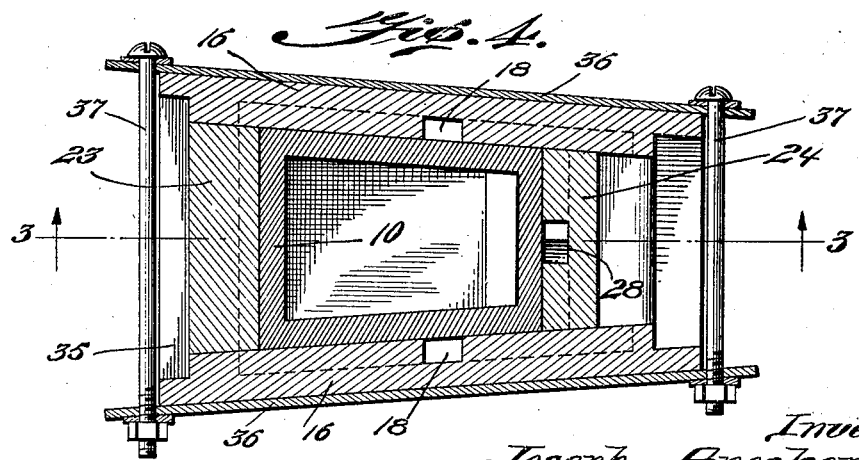

Patented July 14, 1931

1,814,276

UNITED STATES PATENT OFFICE

JOSEPH ANOSKOPAY, OF PROVIDENCE, RHODE ISLAND

MOLD FOR FORMING MOLDED ARTICLES

Application filed September 19, 1929. Serial No. 393,690.

This invention relates to an improvement in molded articles and the mold for forming the same, and more particularly to the production of chairs or other articles of like character in integral form from vulcanized rubber through molding under the influence of heat and pressure to form such articles entirely of one piece and in such a manner as to permit the easy and complete removal of the mold sections at the completion of the vulcanizing operation without injury to the article formed.

One object of the present invention is the provision of an improved article of the character described of integral construction throughout and formed by molding and vulcanizing rubber or rubber composition in such a manner as to permit the removal of the article from the vulcanizing mold without injury thereto.

Another object of the invention is the provision of an improved mold and method of using the same as employed in forming molded articles of the character described wherein the parts of the articles formed are located so as to lie within a vertical shell of curved or angular cross-section and wherein the vertical shell is of uniform cross-sectional area throughout or increases or diminishes substantially uniformly throughout certain portions thereof to permit the ready assemblage and removal of the mold sections without injury to the molded article.

A further object of the invention is the provision of an improved mold for forming articles from rubber or the like in such a manner that the various parts of the formed articles are arranged about and in such relation to a mold core as to permit the assemblage of the mold parts, and the application of heat and pressure to the mold parts, as well as the removal of the mold sections from the finished article, readily and expeditiously and without injury to the article formed.

Other objects and advantages of the invention relate to various improved details of construction and improved steps and arrangements of steps in the formation of the article and in the use of the mold for making the same as will be more fully set forth in the detailed description to follow.

Referring to the drawings:—

Figure 3:
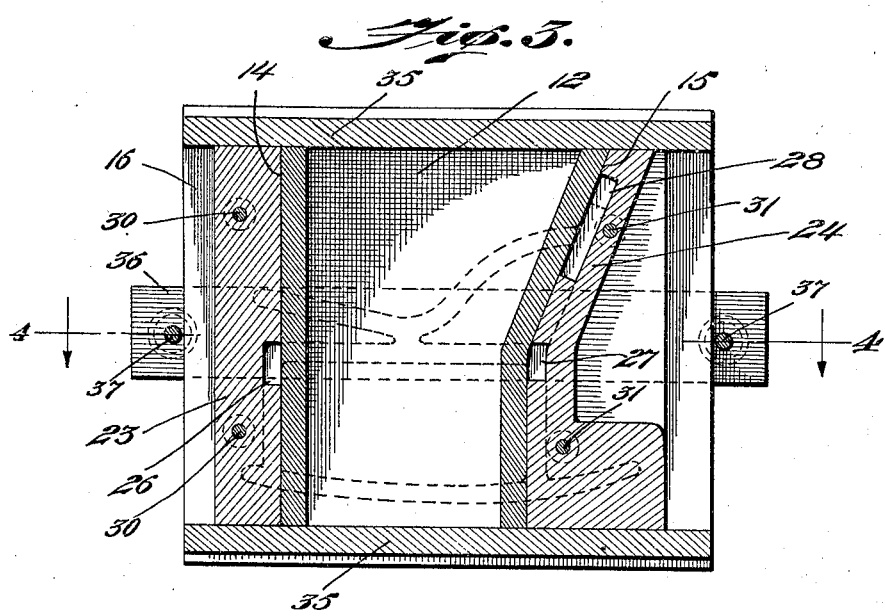

Fig. 1 is a perspective view of a molded rubber chair of integral construction formed in accordance with the disclosure contained herein and by means of my improved mold structure, Fig. 2 is a detached perspective view of the improved mold adapted for use in the formation of molded articles of such a character as to have the parts thereof located within a vertical shell of curved or angular cross-section, Fig. 3 is a vertical sectional view of the mold structure, taken substantially along the line 3—3 of Fig. 4, and, Fig. 4 is a horizontal sectional view of the mold structure, taken substantially along the line 4—4 of Fig. 3.

In the embodiment of the invention illustrated herewith there is shown a molded rubber chair of integral construction wherein the parts are so arranged as to form a vertical shell of angular cross-section so that the various elements making up the chair structure all lie within the angular shell so that a tapered core member may be inserted within or removed from the chair without injury to or destruction of any of the chair elements, and wherein the chair elements are so arranged that they may be formed wholly within recesses located in those portions of the mold sections which surround the core member. It will be understood that the general form of mold and method of using the same is not confined to the formation of chairs, but may be employed to advantage in the formation of various other articles which are of such construction that the elements thereof may be arranged about a central core of angular or circular form, and in such a manner that a single tapered core member or a two-part core member made up of tapered sections may be employed and the core member or core member sections readily removed from the finished article without injury thereto or to the parts thereof. In the present instance I have shown an article and mold therefor so formed as to permit the use of a single core member which is tapered from top to bottom and which is of angular cross-sectional form. It will be obvious, however, that the construction lends itself readily to the use of two core member sections, which extend inwardly from the top and bottom sides of the mold respectively, and which may both be tapered inwardly from the top or bottom side of the mold towards the horizontal center thereof, thus permitting the separate removal of such mold sections after the formation of the article without injury to the parts thereof. It will, of course, be understood that in each case outer mold sections are shaped to fit about the core member or core member sections, and that such outer mold sections are provided with surface recesses for the reception of the material to be molded, which material is confined in the recesses during the process of heating the same by the presence of the core member or core member sections and pressure may be exerted thereon during the heating of the same by force applied to the outer core sections, or by holding the outer core sections against separation and applying force to the enlarged end or ends of the core member or core member sections.

In the form of the invention specifically set forth herein, 1 designates a molded rubber chair of integral construction comprising front and rear seat frame members 2 and 3, side seat frame members 4, front supporting posts 5, rear supporting posts 6, rockers 7, arm rests 8, and a back 9.

It will be seen that the arrangement of these parts of the chair structure is such that an angular core member which is roughly tapered from top to bottom will fit within the chair in such a manner as to be removable therefrom without injury to the chair parts, the several elements of the chair structure being positioned within suitable recesses formed in outer mold sections which are located about the core member.

In the form of the invention illustrated herein the mold comprises a hollow core member 10 which is generally tapered from top to bottom through a portion of its extent, as indicated at 11, and which is hollowed out as indicated at 12, and is provided with similar plane side surfaces 13, and dissimilar side surfaces 14 and 15, all of which are adapted to fit closely against the inner surfaces of outer mold sections when the mold is assembled.

The outer mold sections comprises two similar side sections 16, each of which is provided with a seat frame recess 17, an arm rest recess 18, a rocker recess 19 and post recesses 20 and 21 for the reception of rubber or other vulcanizable material for forming portions of the chair. These side mold sections 16 are adapted to fit against the side surfaces 13 of the core member when the parts are in assembled position, as well as against the ends of the remaining mold sections and thus completely close the recesses formed upon the inner surfaces thereof. Outer mold sections 23 and 24 fit against the side surfaces 14 and 15 respectively of the core member, the mold section 23 being provided with a seat frame recess 26, and the mold section 24 being provided with a seat frame recess 27 and seat back recess 28. Bolts 30 and 31 are passed through the side mold sections 16 and through the horizontal extent of the mold sections 23 and 24 respectively, whereby the mold sections 16, 23 and 24 may be firmly bolted together prior to or after the insertion of the core member 10 therebetween. The side mold sections 16 may be formed with outer portions 32 of reduced thickness in order to provide ample thickness in the recessed portion 33 for the several recesses containing the vulcanizable material, and provide shoulders 34 for receiving top or bottom plates 35, if desired, and entirely enclosing the core member.

Holding means in addition to the bolts 30 and 31, or as substitutes therefor, may be provided, if desired, such as the metal plates 36 located upon opposite sides of the mold and engaging the mold sections 16, which plates may be secured together to bind the mold sections in place by means of bolts 37.

In the formation of a molded article by means of the improved mold structure, the recesses in the outer mold sections are all completely filled with the vulcanizable material, such as a suitable rubber composition or the like, and the outer mold sections are then assembled after the manner indicated in Fig. 2 of the drawings with bolts 30 and 31 passed through opposite ends of the side sections 16 and the longitudinal extent of the sections 23 and 24. Nuts may be applied to the ends of the bolts 30 and 31, and the outer mold sections firmly and securely clamped together. The core member 10 may then be inserted to fit closely against the inner faces of the outer core sections and completely close the recesses containing the vulcanizable material. Pressure may be applied to the top of the core member 10 before and during the heating of the mold to prevent expansion of the vulcanizable material under the influence of heat and thus effect the vulcanization under pressure.

It will be seen that pressure may be applied in a similar manner when two tapered core sections are employed, in which case pressure will be applied both to the top and to the bottom of the core sections to force their reduced ends into close contact at the center of the mold. The core member or core sections are preferably hollowed out in order to permit free flow of steam therethrough during the vulcanizing operation.

When for any reason, a core member is used which is of other than tapered form, as above described, so that pressure cannot be exerted directly upon the vlucanizable material through force applied to one end of core member, the clamping means consisting of plates 36 and bolts 37 may be employed for exerting pressure on the material during vulcanization, or both of these means may be employed together if desired.

From the above description when taken in connection with the accompanying drawings it will be seen that the novel mold structure and method of using the same are applicable for use in connection with the formation of a variety of articles in which the parts are so arranged or may be arranged in the form of a shell of angular or curved cross-section to permit the use of a central core member or central core sections capable of being so formed as to be removable from the finished article without injury thereto. While it is regarded as preferable that the core member or core sections be tapered somewhat throughout a portion at least of their lengths as providing an effective means for forcing the core into close engagement with the outer mold sections, other means may be employed for this purpose such as a binding frame located outwardly of the outer mold sections as shown and described.

Since I am aware that various changes may be made in the form and arrangement of the several parts of the core member or sections, as well as the form and arrangement of the outer mold sections, I do not desire to be limited to the exact arrangement of the parts as shown and described, or any of them, nor is it my intention that the invention be limited to the specific form and arrangement of the parts as shown in the embodiment of the invention illustrated herewith but that the appended claims be broadly construed in the light of my disclosure.

What I claim is:—

1. A mold for forming an integral skeleton structure from a rubber composition which comprises, an internal core having a portion thereof tapered, side sections surrounding said tapered core and provided with interconnected channels lying within two or more planes, certain of the channels in each outer section communicating with one of the channels in another outer section, and means for applying pressure to certain of said outer sections in the direction of the central core.

2. In a mold for forming a skeleton structure having the several parts thereof integral, the combination with a central member having a smooth outer surface a portion of which is tapered, of side sections having portions fitting closely against the central member and provided with separate passages having connected portions formed in the faces thereof which are in contact with the central member, and means for exerting pressure upon said side sections to force them towards the central member.

3. A mold for forming a skeleton structure having a central unobstructed passage which comprises, a central member having plain outer faces, certain of said outer faces being tapered, side sections shaped to fit against the outer faces of said central member and positioned therearound, said side sections being provided with recesses formed upon the faces thereof which fit against the outer faces of the central member and having certain of said recesses extending continously entirely around the central member when the several parts are in assembled position, whereby when the recesses formed in the side sections are filled with vulcanizable material and positioned about the central member the material will form a complete skeleton shape having certain of the parts connected together to provide a unitary structure.

4. A mold for forming a chair structure which comprises, a central member having plain outer surfaces and a tapered portion, side sections shaped to engage closely the tapered sides of said central member and extend continuously therearound, said side sections being each provided with grooves formed in the faces thereof which engage the central member, and means for holding said side sections in contact with said central member.

5. A mold for forming a chair structure comprising a central member having the external surface thereof substantially smooth, side members surrounding said central member and having recesses formed in the faces of said side members lying adjacent to the central member, the side members being so proportioned relative to the central member that pressure exerted upon the larger end of said central member will tend to completely close the recesses formed in the inner faces of said side sections and exert pressure upon the material contained in said recesses as said material is expanded under the influence of heat.

6. A mold for forming a chair of integral construction from a rubber composition comprising an internal core, a pair of side sections positioned upon opposite sides of said core and having the faces thereof which contact with the core provided with recesses for receiving material for forming the arm rests, side portions of the seat frame, supporting posts, and connecting bars of the chair frame, and side sections for the remaining sides of said core member having recesses formed in their faces engaging the core member for receiving material forming portions of the seat frame, supporting posts, connecting bars, and back structure of said chair, whereby the chair is formed integral throughout from molded rubber composition material.

7. A mold for forming a chair of integral construction from a vulcanized rubber composition comprising, a tapered core member shaped to fit within the seat frame, supporting posts, and connecting bars of the chair and having its outer faces contacting with said elements of the chair; and side sections having portions fitting against the outer faces of said core member and provided with recesses formed in the portions thereof which engage the outer faces of the core member to receive the material for forming the seat frame, supporting posts, and connecting bars of the chair; and means for exerting pressure between the side sections and the core member during the process of vulcanizing the rubber material to form an integral chair structure.

8. A mold for forming a skeleton structure comprising an internal core the outer surface of which is smooth and shaped to fit against the inner surfaces of surrounding outer sections, and outer sections surrounding said internal core and provided with recesses formed in the inner faces thereof, certain of the recesses of one outer section being so arranged as to communicate with certain of the recesses of one or more of the other outer sections when the parts are in assembled position and the recesses of the several outer sections being interconnected to form a skeleton shaped molded structure which is integral throughout.

In testimony whereof I have affixed my signature.

JOSEPH ANOSKOPAY.